United States Patent
Choi et al.

(10) Patent No.: US 10,566,589 B2
(45) Date of Patent: Feb. 18, 2020

(54) BATTERY MODULE AND BATTERY PACK COMPRISING SAME

(71) Applicant: LG CHEM, LTD., Seoul (KR)

(72) Inventors: Jong-Woon Choi, Daejeon (KR);
Hang-June Choi, Daejeon (KR);
Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 15/570,458

(22) PCT Filed: Jun. 28, 2016

(86) PCT No.: PCT/KR2016/006915
§ 371 (c)(1),
(2) Date: Oct. 30, 2017

(87) PCT Pub. No.: WO2017/052041
PCT Pub. Date: Mar. 30, 2017

(65) Prior Publication Data
US 2018/0145294 A1    May 24, 2018

(30) Foreign Application Priority Data

Sep. 21, 2015    (KR) .......................... 10-2015-0133196

(51) Int. Cl.
*H01M 2/10*    (2006.01)
*H01M 10/6555*    (2014.01)
(Continued)

(52) U.S. Cl.
CPC .......... *H01M 2/1094* (2013.01); *H01M 2/10* (2013.01); *H01M 2/1061* (2013.01);
(Continued)

(58) Field of Classification Search
None
See application file for complete search history.

(56) References Cited

U.S. PATENT DOCUMENTS

2007/0037053 A1    2/2007    Anantharaman
2011/0256446 A1    10/2011   Bronczyk et al.
(Continued)

FOREIGN PATENT DOCUMENTS

CN    101288189 A    10/2008
CN    102347461 A    2/2012
(Continued)

OTHER PUBLICATIONS

International Search Report for PCT/KR2016/006915 dated Oct. 21, 2016.

*Primary Examiner* — Jonathan Crepeau
(74) *Attorney, Agent, or Firm* — Birch, Stewart, Kolasch & Birch, LLP (57) ABSTRACT

Disclosed is a battery module, which may stably maintain a secondary battery stack and have less damage to an electrode lead due to external vibration, and a battery pack including the battery module. The battery module comprises a plurality of pouch-type secondary batteries respectively configured to accommodate an electrode assembly in a pouch thereof so that an electrode lead connected to an electrode tab of the electrode assembly is drawn through a terrace portion of the pouch, and a fixing member interposed at least partially between the secondary batteries and adhered and fixed to the terrace portion to maintain the secondary batteries in a stacked state.

13 Claims, 6 Drawing Sheets

(51) Int. Cl.
  *H01M 10/613* (2014.01)
  *H01M 10/647* (2014.01)
(52) U.S. Cl.
  CPC ....... *H01M 2/1077* (2013.01); *H01M 10/613* (2015.04); *H01M 10/647* (2015.04); *H01M 10/6555* (2015.04); *H01M 2220/20* (2013.01)

(56) References Cited

U.S. PATENT DOCUMENTS

| | | |
|---|---|---|
| 2012/0040226 A1 | 2/2012 | Kim et al. |
| 2013/0122346 A1 | 5/2013 | Jiang et al. |
| 2015/0037626 A1 | 2/2015 | Malcolm et al. |
| 2015/0118541 A1 | 4/2015 | Seong et al. |
| 2016/0020442 A1* | 1/2016 | Nakashima ......... H01M 2/1077 429/7 |
| 2016/0133898 A1 | 5/2016 | Choi et al. |
| 2016/0164147 A1 | 6/2016 | Suzuki |

FOREIGN PATENT DOCUMENTS

| | | |
|---|---|---|
| CN | 103443960 A | 12/2013 |
| CN | 104488127 A | 4/2015 |
| CN | 204464348 U | 7/2015 |
| JP | 2005-122927 A | 5/2005 |
| JP | 2009-272048 A | 11/2009 |
| JP | 2012-138315 A | 7/2012 |
| JP | 2013-51100 A | 3/2013 |
| JP | 2014-112557 A | 6/2014 |
| KR | 10-2012-0014856 A | 2/2012 |
| KR | 10-2014-0102785 A | 8/2014 |
| KR | 10-1454987 B1 | 10/2014 |
| KR | 10-2014-0141825 A | 12/2014 |
| KR | 10-2015-0037335 A | 4/2015 |
| KR | 10-2015-0104432 A | 9/2015 |
| WO | WO 2014/141525 A1 | 9/2014 |
| WO | WO 2014/161719 A1 | 10/2014 |

* cited by examiner

BATTERY MODULE AND BATTERY PACK COMPRISING SAME

TECHNICAL FIELD

The present disclosure relates to a battery module including at least one secondary battery and a battery pack comprising the same, and more particularly, to a battery module capable of protecting an electrode lead against external vibrations and a battery pack comprising the same. The present application claims priority to Korean Patent Application No. 10-2015-0133196 filed on Sep. 21, 2015 in the Republic of Korea, the disclosures of which are incorporated herein by reference.

BACKGROUND ART

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a laminate sheet pouch of aluminum and polymer resin, depending on the shape of the exterior.

Recently, secondary batteries are widely used not only for small-sized devices such as cellular phones but also middle-sized or large-sized devices such as vehicles and power storages. When being used for middle-sized or large-sized devices, a great number of secondary batteries are electrically connected to enhance capacity and output. In particular, the pouch-type secondary batteries are frequently used for the middle-sized or large-sized devices due to small weight, low production costs and easy shape change.

However, the pouch-type secondary battery is generally not easily stacked since it does not have large mechanical rigidity and does not have a structure for coupling batteries to each other. Therefore, when a battery module including a plurality of pouch-type secondary batteries is constructed, a separate coupling member such as a cartridge is required to protect the secondary battery stack against external impacts, prevent movements thereof and allow easy stacking.

In an existing technique, when a battery module is configured, an overlap design is applied to the secondary battery body, or a surface pressure is applied to a large area portion of the body in order to fix secondary batteries. If the existing battery module configuration is used, when an external vibration is applied, the body portions of the secondary batteries are shaken, and also the mechanical impact is transmitted to an electrode tab drawn from the electrode assembly and an electrode lead connected thereto, thereby causing a problem in the electric connection. As described above, the existing battery module configuration has a defect in view of electrode lead protection.

DISCLOSURE

Technical Problem

The present disclosure is designed to solve the problems of the related art, and therefore the present disclosure is directed to providing a battery module, which may stably maintain a secondary battery stack and have less damage to an electrode lead due to external vibration, and a battery pack including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising: a plurality of pouch-type secondary batteries respectively configured to accommodate an electrode assembly in a pouch thereof so that an electrode lead connected to an electrode tab of the electrode assembly is drawn through a terrace portion of the pouch; and a fixing member interposed at least partially between the secondary batteries and adhered and fixed to the terrace portion to maintain the secondary batteries in a stacked state.

The fixing member may be adhered to the terrace portion by means of an adhesive or a double-sided adhesive tape. At this time, the adhesive or the double-sided adhesive tape may at least partially include a thermally-conductive polymer, or include a thermally-conductive material containing a thermally-conductive filler and a polymer.

In an embodiment, the fixing member may be a stacking frame of a rectangular ring shape which is capable of being stacked one another, and accommodate the pouch-type secondary battery in an inner space thereof.

At this time, the secondary battery may be configured with a rectangular shape whose outer circumference has two long sides and two short sides, so that the terrace portion is formed at the two short sides and adhered to the fixing member.

In addition, the fixing member may be provided in plural, and two secondary batteries may be adhered to one fixing member.

In addition, the fixing member may be shaped to be engaged with and fixed to another fixing member adjacent thereto.

In addition, a portion of the fixing member interposed between the secondary batteries may be adhered to the terrace portion.

The secondary batteries may be stacked to make surface contact with each other.

In another embodiment, the fixing member may be a spacing block having horizontal bars respectively interposed between the secondary batteries and a vertical bar integrating the horizontal bars.

At this time, the terrace portions of two secondary batteries may be respectively adhered to an upper surface and a lower surface of the horizontal bar.

The horizontal bar may be shaped to have a size identical to the height of a space between the terrace portions of two secondary batteries.

In addition, the secondary battery may be configured with a rectangular shape whose outer circumference has two long sides and two short sides, so that the terrace portion is formed at the two short sides, and the spacing block is provided in a pair.

Preferably, the fixing member may at least partially include a thermally-conductive polymer, or include a thermally-conductive material containing a thermally-conductive filler and a polymer.

In another aspect of the present disclosure, there is also provided a battery pack, comprising the battery module according to the present disclosure.

In addition, the battery module according to the present disclosure and the battery pack comprising the battery module may be applied to a vehicle.

Advantageous Effects

According to one aspect of the present disclosure, it is possible to simplify the structure of a battery module, reduce a volume thereof and improve the manufacturability thereof.

In particular, according to the present disclosure, the secondary battery may be directly adhered to the fixing member, and further, two adjacent fixing members may be adhered to one secondary battery. Thus, the battery module does not have a complicated structure but allows easy assembling and ensures reduced manufacturing cost and time. In addition, by reducing the volume of the battery module, the battery module may be designed in a small size more easily. Also, by reducing the weight of the battery module, the battery module may have an advantageous design enabling weight reduction.

According to the present disclosure, the fixing member is adhered and fixed to the terrace portion from which the electrode lead of the secondary battery is drawn. The fixation area is adjacent to the electrical connection portion and excellently protects the electrode lead against external vibration. In addition, by improving the thermal conductivity of the fixation area, it is possible to prevent physical and chemical deformation of the components of the battery module, caused by high-temperature heat or accumulated heat, and ultimately, the change of resistance of the battery module and the battery pack including the battery module is suppressed, thereby maintaining an optimal operation state.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure. In the drawings, like numerals represent like elements.

Figure 1:
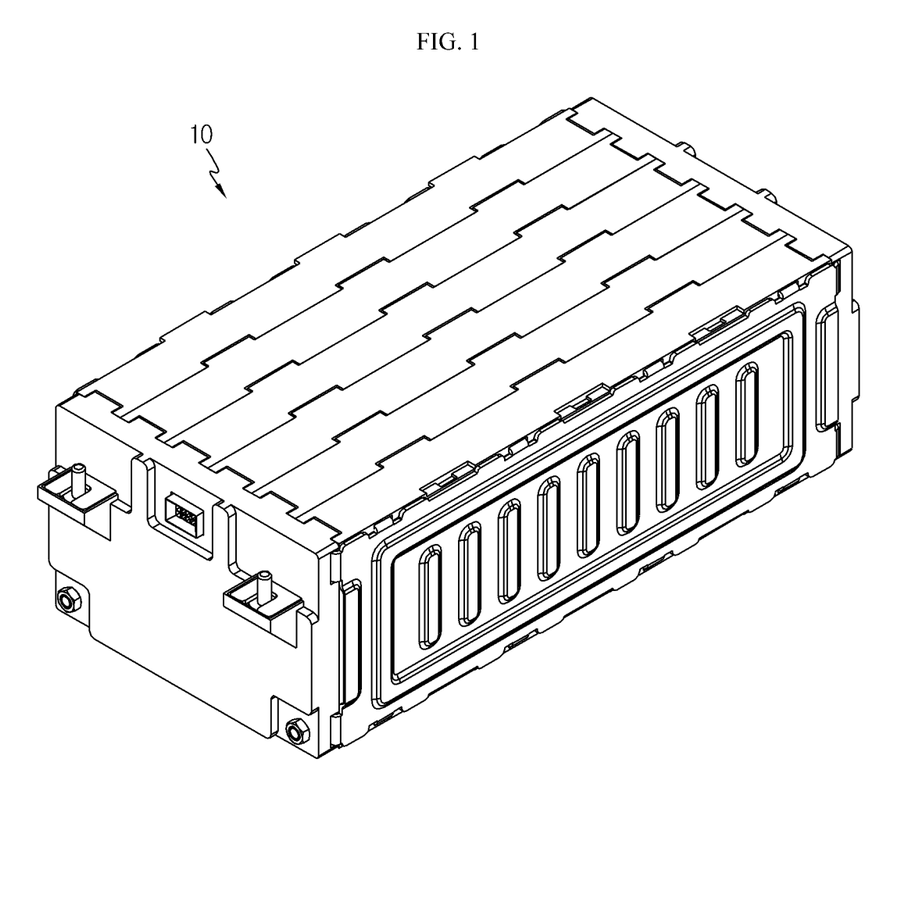
FIG. 1 is a perspective view showing a battery module according to an embodiment of the present disclosure.
Figure 2:
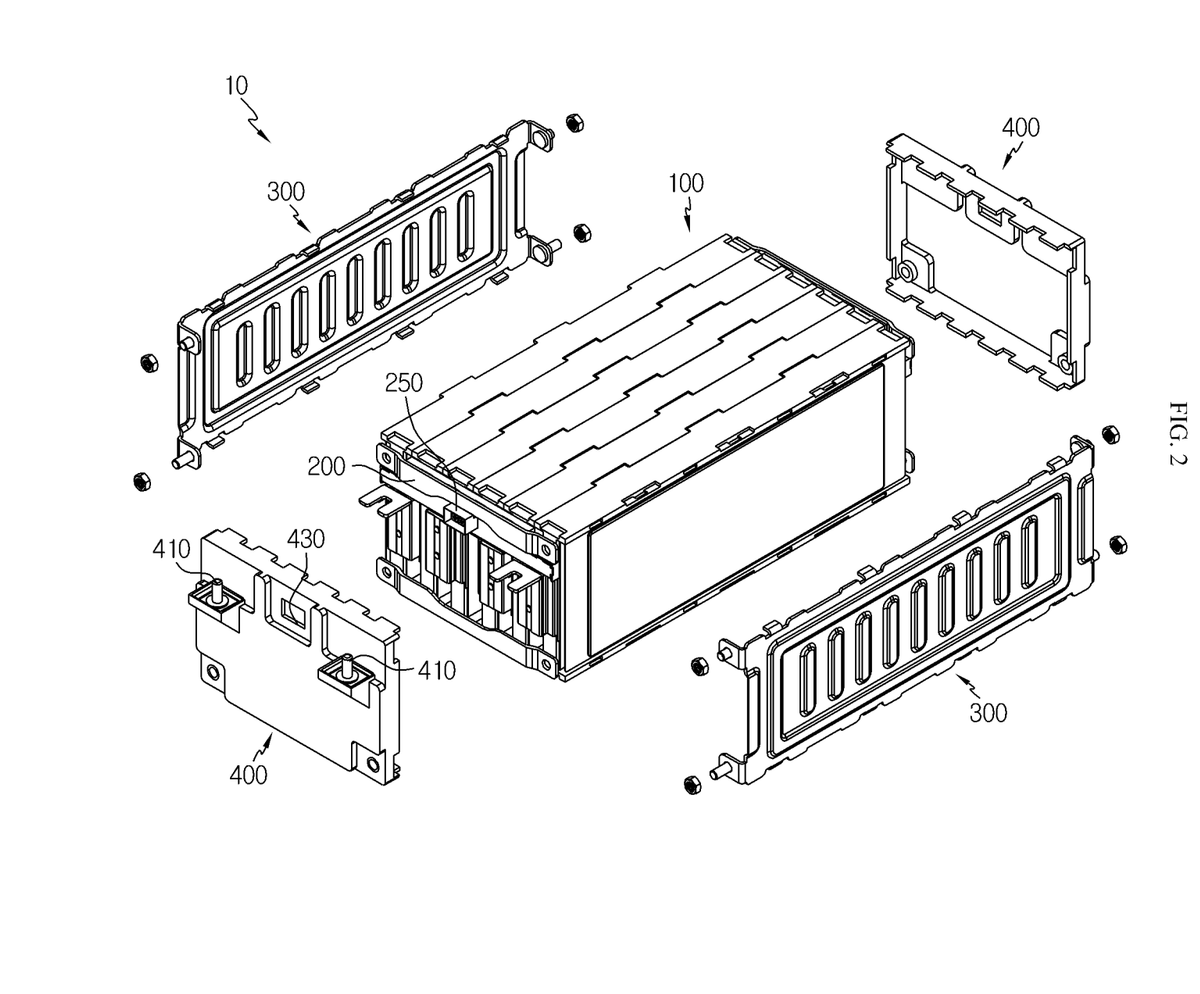
FIG. 2 is an exploded perspective view showing the battery module of FIG. 1.

FIG. 1 is a perspective view showing a battery module according to an embodiment of the present disclosure, and FIG. 2 is an exploded perspective view showing the battery module of FIG. 1.

Referring to FIGS. 1 and 2, the battery module 10 may include a secondary battery assembly 100, a terminal frame 200, an end plate 300 and a cover frame 400.

Figure 3:
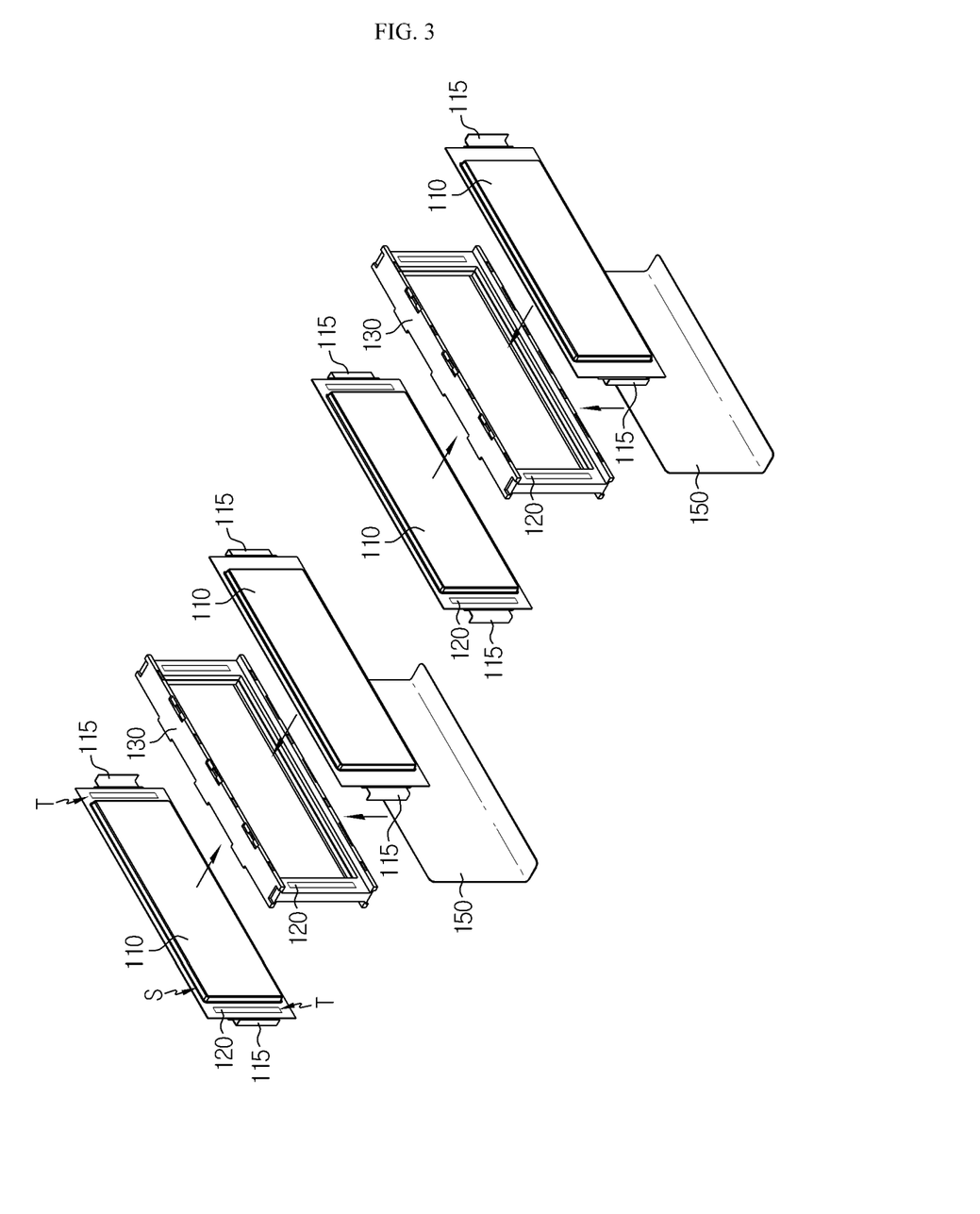
FIG. 3 is an exploded perspective view showing a secondary battery assembly included in the battery module of FIG. 2.

FIG. 3 is an exploded perspective view showing a secondary battery assembly included in the battery module of FIG. 2. FIG. 3 schematically shows only a portion of the configuration of FIGS. 1 and 2, where pouch-type secondary batteries 110 are stacked using the stacking frame 130. In FIG. 3, only four pouch-type secondary batteries 110 and two stacking frames 130 are depicted for convenience.

Referring to FIG. 3, the secondary battery assembly 100 may include a secondary battery 110, a stacking frame 130 and a cooling fin 150.

The secondary battery 110 is provided in plural, and the plurality of secondary batteries 110 may be electrically connected to each other. The secondary battery 110 is a pouch-type secondary battery. If the pouch-type secondary battery is used, a plurality of secondary batteries 110 may be electrically connected more easily.

The plurality of secondary batteries 110 may be arranged in a vertical direction in a laid state so that their broad surfaces are oriented upwards and downwards. In other words, a single battery module 10 may include a plurality of pouch-type secondary batteries 110, and the plurality of pouch-type secondary batteries 110 may be stacked vertically so that their broad surfaces face each other. However, this stacking form is just an example, and the plurality of pouch-type secondary batteries may also be stacked in a horizontal direction.

Each secondary battery 110 may include an electrode assembly, a pouch serving as a battery case accommodating the electrode assembly, and an electrode lead 115. Here, the electrode lead 115 may include a positive electrode lead connected to a positive electrode tab and a negative electrode lead connected to a negative electrode tab. Here, the positive electrode tab may be connected to a positive electrode plate of the electrode assembly, and the negative electrode tab may be connected to a negative electrode plate of the electrode assembly.

As well known in the art, the electrode assembly may be configured so that at least one positive electrode plate and at least one negative electrode plate are arranged with a separator being interposed therebetween. In more detail, the electrode assembly may be classified into a winding-type electrode assembly in which a single positive electrode plate and a negative electrode plate are wound together with a separator, and a stacking-type electrode assembly in which a plurality of positive electrode plates and a plurality of negative electrode plates are alternately stacked with a separator being interposed therebetween.

In addition, the pouch may be configured to have an outer insulation layer, a metal layer and an inner adhesive layer. The pouch may be configured to include a metal foil, for example an aluminum foil, to protect inner components such as an electrode assembly and an electrolyte and also to supplement electrochemical properties by the electrode assembly and the electrolyte and enhance heat radiation. In addition, the aluminum foil may be interposed between insulation layers made of an insulating material in order to ensure electric insulation from inner components of the secondary battery 110 such as an electrode assembly and an electrolyte and other components out of the secondary battery 110.

In particular, the pouch may be composed of an upper pouch and a lower pouch, and at least one of the upper and lower pouches may have an inner space with a concave shape. In addition, the electrode assembly may be accommodated in the inner space of the pouch. Moreover, sealing portions S may be provided at outer circumferences of the upper and lower pouches, and these sealing portions may be adhered to each other so that the inner space accommodating the electrode assembly is sealed.

Meanwhile, an electrode tab is provided at each electrode plate of the electrode assembly, and at least one electrode tab may be connected to an electrode lead 115. In addition, the electrode lead 115 may be interposed between the sealing portions S of the upper and lower pouches and exposed out of the pouch, to serve as an electrode terminal of the secondary battery 110.

Preferably, in the secondary battery 110, two electrode leads 115, namely a positive electrode lead and a negative electrode lead, may be provided to protrude in opposite directions. In other words, the secondary battery 110 may be configured to have an approximately rectangular shape with four sides, when being observed in a horizontal direction in FIG. 3. At this time, the positive electrode lead and the negative electrode lead may be provided to protrude at sides opposite to each other. For example, as shown in FIG. 3, in a single secondary battery 110, at least one of the positive electrode lead and the negative electrode lead may be configured to protrude forwards, and the other may be configured to protrude rearwards.

In the sealing portion S, a region where the electrode lead 115 is drawn is particularly called a terrace portion T. The terrace portion T is formed in order to prevent the electrode lead 115 from being deformed or damaged at a border between the electrode lead 115 and the pouch and also to ensure stable coupling between the electrode lead 115 and the pouch. In this embodiment, the secondary battery 110 is configured with a rectangular shape whose outer circumference has two long sides and two short sides, and the terrace portion T is formed at two short sides. In addition, the terrace portion T is adhered and fixed to the stacking frame 130.

The stacking frame 130 allows a plurality of secondary batteries 110 to be easily stacked, and at least one secondary battery 110 among the plurality of secondary batteries 110 may be placed thereon. The stacking frame 130 is an example of a fixing member proposed in the present disclosure, and the stacking frame 130 may have a rectangular ring shape with a hollow center. At this time, four edges of the stacking frame 130 are located at the outer circumference of the secondary battery 110, and the stacking frame 130 may accommodate the secondary battery 110 in the inner space thereof. In addition, both sides of the stacking frame 130 are shaped so that the secondary batteries 110 are respectively located thereat. In addition, when the battery module is configured later, the top surface and the bottom surface of the stacking frame 130 become the top surface and the bottom surface of the battery module, which are exposed outwards, and thus the top surface and the bottom surface of the stacking frame 130 may have a flat shape.

The stacking frame 130 may be provided in plural, and in this embodiment, two secondary batteries 110 may be placed on each stacking frame 130. The present disclosure is not limited thereto, and each stacking frame may be configured to place a single secondary battery thereon, or three or more secondary batteries may be placed on a single stacking frame.

The plurality of stacking frames 130 may hold the plurality of secondary batteries 110 to prevent shaking thereof, and the plurality of stacking frames 130 may be stacked one another to guide assembling of the secondary batteries 110. In addition, the stacking frame 130 may be shaped so as to be engaged with and fixed to another stacking frame adjacent thereto. In other words, a coupling protrusion may be formed at one side of the top end of a sidewall of the top surface and the bottom surface of the stacking frame 130 so as to be coupled to another stacking frame, and a coupling groove corresponding to the coupling protrusion may be formed at one side of the bottom end of the sidewall, so that the coupling protrusion is fitted into the coupling groove to stack the stacking frames 130.

The cooling fin 150 may be made of a thermally-conductive material such as aluminum and may be provided at each stacking frame 130 to exchange heat with the secondary battery 110. The cooling fin 150 provided at each stacking frame 130 may be inserted into the stacking frame 130 or insert-molded therein. Thus, if the secondary batteries 110 are stacked using the stacking frames 130, the cooling fin 150 may be interposed between the secondary batteries 110. The cooling fin 150 plays a role of emitting heat of the secondary battery 110 in an indirect cooling method. Though FIG. 3 depicts an 'L'-shaped cooling fin, a 'T'-shaped or T-shaped cooling fin may also be used.

The stacking frame 130 is interposed between the secondary batteries 110, the portion interposed between the secondary batteries 110 is adhered and fixed to the terrace portion T, and such stacking frames 130 are piled up to maintain the secondary batteries 110 stacked one another. Preferably, the stacking frame 130 and the terrace portion T may be adhered by means of an adhesive or a double-sided adhesive tape 120.

For example, the adhesive or double-sided adhesive tape 120 may be applied to the terrace portion T of the secondary battery 110 and/or a region of the stacking frame 130 which encounters the terrace portion T, and the terrace portion T and the stacking frame 130 may be adhered and fixed to each other. Since the secondary battery 110 and the stacking frame 130 are fixed by means of the adhesive or double-sided adhesive tape 120, the assembling process may be very conveniently performed, and the structure may become very stable after the assembling process.

In the secondary battery 110 of this embodiment, the terrace portion T is provided at two points, namely at the short sides, and thus the adhesive or double-sided adhesive tape 120 is applied at least two points for every secondary battery 110. Thus, stable coupling is ensured between the stacked secondary batteries 110 and the stacking frames 130. Further, since the secondary battery 110 and the stacking frame 130 are spaced apart from each other as much as the thickness of the adhesive or double-sided adhesive tape 120, the space buffers the change of volume of the secondary batteries 110 during the charging/discharging process and also effectively emit the heat of the secondary batteries 110 during the charging/discharging process.

Figure 4:
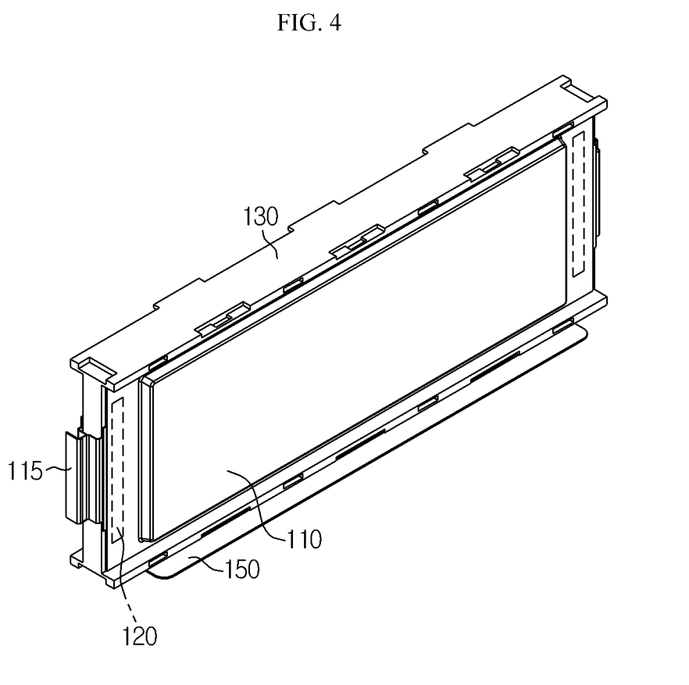
FIG. 4 shows a state where two secondary batteries are coupled to one stacking frame in the secondary battery assembly included in the battery module of FIG. 2.

FIG. 4 shows a state where two secondary batteries are coupled to one stacking frame in the secondary battery assembly included in the battery module of FIG. 2. The structure where two secondary batteries 110 are coupled to one stacking frame 130 as above may be called a "central frame type two-cell battery module".

As shown in FIG. 4, the stacking frame 130 and the secondary battery 110 are coupled to each other at the terrace portion T.

In the existing technique, when an external vibration is applied, the body portions of the secondary batteries are shaken, and also the impact is intactly transferred to an electrode tab drawn from the electrode assembly and also an electrode lead connected thereto. However, in the present disclosure, the stacking frame 130 and the secondary battery 110 are adhered and fixed at the terrace portion T by means of the adhesive or double-sided adhesive tape 120 to prevent shaking with respect to each other. Accordingly, the body of the secondary battery 110 and the electrode lead 115 are isolated from each other on the basis of the terrace portion T. Even though an external vibration is applied, the external vibration gives an influence only to the body of the secondary battery 110, so that the secondary battery 110 is shaken only in a direction perpendicular to a broad surface of the secondary battery 110 on the basis of the stacking frame 130 to solve the external vibration. However, vertical and horizontal shaking of the electrode lead 115 drawn from the terrace portion T adhered and fixed to the stacking frame 130 may be prevented. Thus, the electrode lead 115 may be protected against the external vibration.

If several "central frame type two-cell battery modules" as shown in FIG. 4 are collected, the secondary battery assembly 100 as shown in FIG. 2 may be obtained. During the assembling process, the stacking frame 130 and the secondary battery 110 are adhered and fixed to each other, and thus the secondary battery 110 is never deviated from the stacking frame 130.

As described above, if two secondary batteries 110 are adhered and fixed to one stacking frame 130, the secondary battery assembly 100 may be stably fixed even though there is no configuration for coupling the stacking frames 130 or coupling the secondary batteries 110. Since the stacking frames 130 are shaped to be engaged with each other and also the stacking frame 130 and the secondary battery 110 are coupled at the terrace portion T, the stacked configuration may be stably maintained with restricted movement.

The secondary battery assembly 100 may be classified into two types. One is a parallel-type (P-type) module in which electrode leads 115 of the same polarity formed at two secondary batteries 110 are exposed in the same direction. The other is a serial type (S-type) module in which electrode leads 115 of the same polarity formed at two secondary batteries 110 are exposed in opposite directions. The secondary battery assembly 100 may include any one of the P-type module and the S-type module, or include both the P-type module and the S-type module.

The stacking frame 130 may be made of an insulating material, for example a thermoplastic polymer resin. In addition, the stacking frame 130 may be made of an elastic material to relieve an impact when being dropped. Preferably, the stacking frame 130 is made of PA66.

More preferably, the stacking frame 130 may be at least partially made of a thermally-conductive material. A cartridge used for stacking secondary batteries in the existing technique is generally made of a polymer material without thermal conductivity. Since thermal conduction is substantially not performed through the cartridge, a cooling member is separately provided, in many cases. However, in the present disclosure where the stacking frame 130 is made of a thermally-conductive material, the heat of the secondary battery 110 may be easily transferred to the outside through the terrace portion T via the stacking frame 130. Thus, in the point of view of the present disclosure, even though a separate cooling member such as the cooling fin 150 is not provided between the secondary batteries 110, effective cooling performance may be ensured.

In particular, the stacking frame 130 may at least partially include a thermally-conductive polymer or be made of a thermally-conductive material containing a thermally-conductive filler and polymer.

In other words, the stacking frame 130 may be made using a polymer as a main material, instead of general metal or metal alloy. The polymer-based thermally-conductive material is lighter than metal, which allows the battery module to easily have a lighter design, ensures easy molding, low thermal expansion coefficient and low electric conduction, which leads to better electric insulation. In the present disclosure, the material of the stacking frame 130 may adopt various kinds of polymer-based thermally-conductive materials known to the public at the time of filing of the present disclosure.

For example, the stacking frame 130 may be made of a composite material in which a general polymer is mixed with thermally-conductive fillers. Here, the filler may include silicon compound, aluminum compound, magnesium compound, boron compound or the like. For example, the filler included in the thermally-conductive material may employ silicon oxide, aluminum oxide, boron nitride, aluminum nitride, magnesium oxide, anhydrous magnesium carbonate, magnesium hydroxide or the like. However, the present disclosure is not limited thereto, and various fillers other than the above may also be used as a material of the fixing member.

The polymer used in the stacking frame 130 may include various materials such as polypropylene, acrylonitrile butadiene styrene, polycarbonate, nylon, liquid crystal polymer, polyphenylene sulfide, polyetherether ketone or the like. In addition, various polymer materials other than the above may also be used as a material of the fixing member of the present disclosure.

In particular, the thermally-conductive material of the stacking frame 130 may have thermal conductivity of 1 W/mK or above. For example, this thermally-conductive material may be polymer plastic or rubber with 2 W/mK to 20 W/mK. Further, the thermally-conductive material may be composed of a material with 5 W/mK or above.

In an existing technique, plastic used as a material of a cartridge or the like generally has thermal conductivity of just 0.1 W/mK to 0.4 W/mK, which is substantially negligible. However, in case of the stacking frame 130 according to the present disclosure, since a polymer material having higher thermal conductivity is used, heat transfer and emission may be allowed. Therefore, in this embodiment of the present disclosure, even though a cooling member such as the cooling fin 150 is not separately provided in the stacking frame 130, heat of the secondary battery 100 may be effectively discharged to the outside through the stacking frame 130.

Further, in the present disclosure, since the terrace portion T of the secondary battery 110 is directly adhered and fixed to the stacking frame 130, the heat of the secondary battery 110 may be directly transferred to the stacking frame 130 through the terrace portion T. Since the portion of the stacking frame 130 which is in contact with the secondary battery 110 is made of a thermally-conductive material, the heat transferred to the stacking frame 130 may be quickly discharged to the outside through the stacking frame 130.

Meanwhile, various kinds of adhesive materials may be used as the adhesive or double-sided adhesive tape 120 for adhering and fixing the stacking frame 130 and the terrace portion T of the secondary battery 110. Preferably, the stacking frame 130 and the secondary battery 110 may be coupled semi-permanently by means of a high adhesive force possible, or may maintain their coupled state continuously without losing the adhesive force even under a high temperature generated during the heat transfer process. For example, the adhesive material may be a thermally conductive epoxy-based bond, a thermally conductive adhesive tape, or the like.

As another example, the adhesive material may be a thermally-conductive adhesive containing a thermally-conductive material. Since the thermally-conductive adhesive has higher thermal conductivity than a general adhesive, the heat transfer amount and rate between the secondary battery 110 and the stacking frame 130 may be further increased.

For example, the double-sided adhesive tape may employ a tape in which adhesive layers are formed on both sides of a base film having high toughness and a thermally-conductive material is regularly dispersed in the adhesive layers. The base film is in the form of a polymer film with flexibility and gives durability to the double-sided adhesive tape. Preferably, the base film is made of a material having high tensile strength and durability. For example, the base film includes a resin material selected from the group consisting of polyolefins such as polyethylene, polypropylene and the like, polyesters such as polyethylene terephthalate and polybutylene terephthalate, polyvinyl chloride, polystyrene, polyurethane, polycarbonate, polyamide, polyimide, methyl polymetacrylate, polybutene, polybutadiene, and the like. The adhesive layer includes a material having an adhesive property so that the double-sided adhesive tape may adhere the terrace portion T of the secondary battery 110 and the stacking frame 130. For example, the adhesive layer may include acryl-based, polyester-based, polyurethane-based, rubber-based or silicone-based materials. The thermally-conductive material mentioned above may be regularly dispersed in the adhesive material.

The adhesive or double-sided adhesive tape 120 for adhering and bonding the stacking frame 130 and the terrace portion T of the secondary battery 110 may include at least partially a thermally-conductive polymer, or a thermally-conductive material containing a thermally-conductive filler and a polymer.

Thus, in this embodiment of the present disclosure, the heat dissipation performance of the secondary battery 110 through the stacking frame 130 is further improved, and thus the cooling performance of the battery module 10 may be improved.

Referring to FIG. 2 again, the terminal frame 200 is provided at one side of the secondary battery assembly 100 and may be electrically connected to the electrode leads 115 of the plurality of secondary batteries 110 of the secondary battery assembly 100.

The terminal frame 200 may further include a connector 250.

The connector 250 may serve as a terminal for electrically connecting to a control device included in a battery pack, such as a battery management system (BMS), outside the battery module 10.

The end plate 300 is to support the secondary battery assembly 100, and the end plate 300 may be provided in a pair to cover the secondary battery assembly 100 at both sides of the secondary battery assembly 100 which face the secondary battery 110 disposed at the outermost side of the secondary battery assembly 100.

The cover frame 400 is to support the secondary battery assembly 100 together with the pair of end plates 300. The cover frame 400 may be provided in a pair to cover the secondary battery assembly 100 respectively at both sides of the secondary battery assembly 100, which includes the electrode leads 115 of the plurality of secondary batteries 110.

At least one of the pair of cover frames 400 may include a terminal 410 and a connector penetration portion 430.

The terminal 410 may be electrically connected to the terminal frame 200 to be electrically connected to the electrode leads 115 of the plurality of secondary batteries 110. The terminals 410 may be provided as a pair, and may be electrically connected to an external power supply or the like.

The connector penetration portion 430 is formed at the cover frame 400, and may allow the connector 250 to pass through the cover frame 400 to the outside. Accordingly, the connector 250 may be electrically connected to a control device included in a battery pack, like the BMS.

Figure 5:
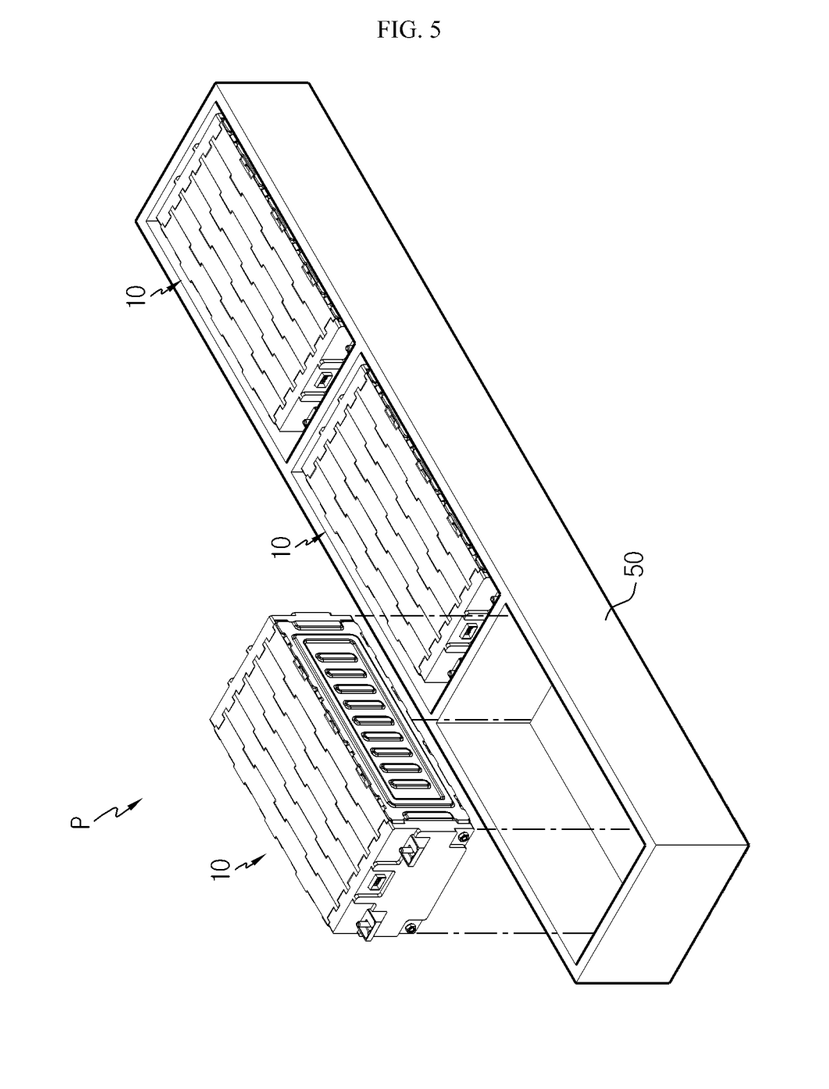
FIG. 5 is a diagram for illustrating a battery pack according to an embodiment of the present disclosure.

FIG. 5 is a diagram for illustrating a battery pack according to an embodiment of the present disclosure.

Referring to FIG. 5, the battery pack P may include a pack case 50 for packaging at least one battery module 10 according to the former embodiment.

The battery pack P according to the present disclosure may be a component of a battery-driven system including the battery pack P and a load supplied with power from the battery pack P. The battery-driven system may be, for example, an electric vehicle (EV), a hybrid electric vehicle (HEV), an electric bicycle (E-bike), a power tool, an energy storage system, an uninterruptible power supply (UPS), a portable computer, a portable telephone, a portable audio device, a portable video device, or the like. The load may be, for example, a motor for providing a rotational force by the power supplied by the battery pack, or a power conversion circuit that converts the power supplied by the battery pack into a power required by various components.

Preferably, the battery pack P may be provided in a vehicle as a fuel source of the vehicle. As an example, the battery pack P may be provided in an electric vehicle, a hybrid electric vehicle, or any other vehicle that may use the battery pack P as a fuel source. The battery pack P according to the present disclosure is particularly well suited for such vehicles, which are frequently exposed to vibratory environments, because of the excellent protection of the electrode leads against external vibrations.

The structures and manufacturing methods of the various kinds of devices described above are well known in the art and thus are not explained in detail here.

As described above, the battery pack P according to this embodiment as well as an apparatus, instrument or equipment having the battery pack P such as the vehicle includes the battery module 10 described above, and thus it is possible to implement the battery pack P and the vehicle having all advantages of the battery module 10.

Figure 6:
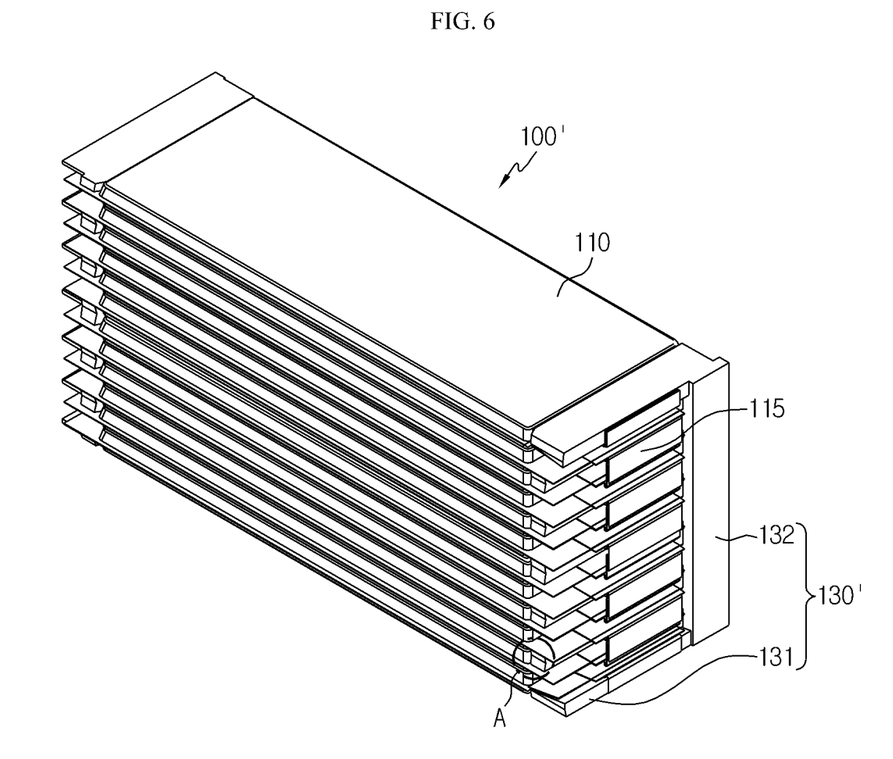
FIG. 6 is a perspective view showing a secondary battery assembly included in a battery module according to another embodiment of the present disclosure.
Figure 7:
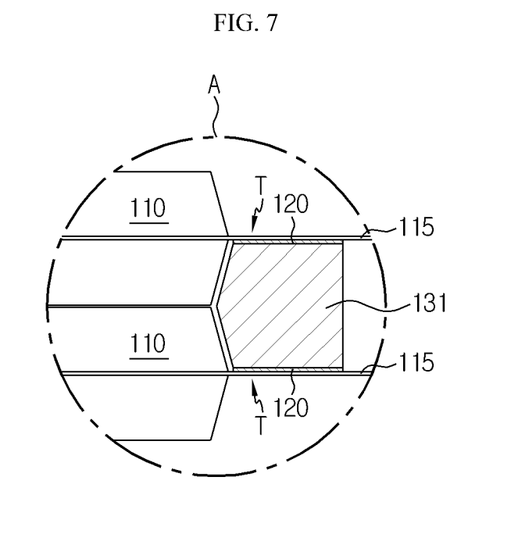
FIG. 7 is a cross-sectional view for illustrating that two secondary batteries are coupled to one horizontal bar in the secondary battery assembly of FIG. 6.

FIG. 6 is a perspective view showing a secondary battery assembly included in a battery module according to another embodiment of the present disclosure. FIG. 7 is a cross-sectional view showing a portion "A" of the secondary battery assembly of FIG. 6 and illustrates that two secondary batteries 110 are coupled to one horizontal bar 131.

The battery module of this embodiment is substantially identical or similar to the battery module 10 in the former embodiment, and thus their differences will be mainly described without explaining identical or similar components again.

Referring to FIGS. 6 and 7, a secondary battery assembly 100' included in the battery module according to this embodiment includes a plurality of pouch-type secondary batteries 110 and a spacing block 130' at least partially interposed between the secondary batteries 110 and adhered and fixed to the terrace portion T to maintain the secondary batteries 110 which are stacked one another. The spacing block 130' is adhered to the terrace portion T by means of the adhesive or double-sided adhesive tape 120. Since the spacing block 130' is adhered to the terrace portion T by means of the adhesive or double-sided adhesive tape 120, it is possible to provide a robust and stable secondary battery assembly 100'.

The spacing block 130' includes horizontal bars 131 respectively interposed between the secondary batteries 110 and a vertical bar 132 integrating the horizontal bars 131. At this time, as shown in detail in FIG. 7, the terrace portions T of two secondary batteries 110 may be adhered to the upper and lower surfaces of the horizontal bar 131, respectively.

Since the horizontal bar 131 is located between two portion portions T of two secondary batteries 110, the horizontal bar 131 is mounted in a surplus space between the secondary batteries 110, which allows the secondary batteries 110 to be stacked compactly. The vertical bar 132 integrates and fixes the horizontal bars 131. The horizontal bars 131 and the vertical bar 132 may be in an integrated type or a separated type. In the separated type, a protrusion and a coupling groove may be appropriately provided at the horizontal bars 131 and the vertical bar 132, so that the horizontal bars 131 may be coupled to the vertical bar 132 after the horizontal bars 131 are adhered and fixed to the terrace portions T of the secondary batteries 110.

Also, as described above, if the spacing block 130' is made of a thermally-conductive material, the heat generated from the secondary batteries 110 may be effectively removed. Preferably, the spacing block 130' has a specific heat capable of easily discharging heat to the outside, and specifically, the spacing block 130' may have a specific heat of 0.8 to 3.0 kJ/kgf° C.

In addition, the horizontal bar 131 may be formed to have a size identical to the height of the space between the terrace portions T of two secondary batteries 110, though not particularly limited as long as the heat received through the terrace portions T may be easily discharged to outside.

As described above, the terrace portions T are formed at two short sides of the secondary battery 110, and accordingly the spacing block 130' is provided at both sides of the secondary battery 110 as a pair.

The secondary battery assembly 100' is accommodated in a suitable module case to manufacture a battery module according to the present disclosure. In addition, one or more battery modules may be mounted in a pack case to form a battery pack.

As described above, the battery module according to the present disclosure includes a fixing member which is adhered and fixed to the terrace portions of the secondary batteries by means of an adhesive or a double-sided adhesive tape. The fixing member may be a stacking frame as in the first embodiment or a block-type structure as in the second embodiment. The fixing member is adhered and fixed to the terrace portion, and thus the body of the secondary battery and the electrode lead are isolated from each other so that external vibrations are not propagated therethrough. Therefore, if this module configuration is used, secondary batteries may be maintained in a stacked state, and the electrode leads may be excellently protected against external vibrations. In particular, the adhesive or double-sided adhesive tape allows the secondary battery stack to be maintained firmly in a compact structure. It is prevented that the secondary batteries are displaced, and the heat generated from the secondary battery during charging and discharging may be conducted along the adhesive or double-sided adhesive tape adhered to the terrace portion and dissipated through the fixing member to the outside of the battery module. Accordingly, it is possible to prevent the battery module from being locally heated, and the electrode lead which causes a problem in relation to heat is easily cooled preferentially in the secondary battery during discharging. Also, it is possible to prevent the secondary batteries from being degraded by uniformly controlling the temperature of every secondary battery, and ultimately the life span of the battery module may be greatly improved.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:
1. A battery module, comprising:
   a plurality of pouch-type secondary batteries respectively configured to accommodate an electrode assembly in a pouch thereof so that an electrode lead connected to an electrode tab of the electrode assembly is drawn through a terrace portion of the pouch; and
   a fixing member interposed at least partially between the secondary batteries and adhered and fixed to the terrace portion to maintain the secondary batteries in a stacked state,
   wherein the fixing member is provided in plural, and two secondary batteries are adhered to one fixing member,
   wherein the fixing member is a stacking frame of a rectangular ring shape which is capable of being stacked on one another, and accommodates the pouch-type secondary battery in an inner space thereof, wherein a first pair of opposed sides of the stacking frame have a same shape, and wherein a second pair of opposed sides of the stacking frame have a same shape.

2. The battery module according to claim 1, wherein the fixing member is adhered to the terrace portion by means of an adhesive or a double-sided adhesive tape.

3. The battery module according to claim 2, wherein the adhesive or the double-sided adhesive tape at least partially includes a thermally-conductive polymer, or includes a thermally-conductive material containing a thermally-conductive filler and a polymer.

4. The battery module according to claim 1, wherein the secondary battery is configured with a rectangular shape whose outer circumference has two long sides and two short sides, so that the terrace portion is formed at the two short sides and adhered to the fixing member.

5. The battery module according to claim 1, wherein the fixing member is shaped to be engaged with and fixed to another fixing member adjacent thereto.

6. The battery module according to claim 1, wherein a portion of the fixing member interposed between the secondary batteries is adhered to the terrace portion.

7. The battery module according to claim 1, wherein the secondary batteries are stacked to make surface contact with each other.

8. A battery module, comprising:

a plurality of pouch-type secondary batteries respectively configured to accommodate an electrode assembly in a pouch thereof so that an electrode lead connected to an electrode tab of the electrode assembly is drawn through a terrace portion of the pouch; and a fixing member interposed at least partially between the secondary batteries and adhered and fixed to the terrace portion to maintain the secondary batteries in a stacked state, wherein the fixing member is a spacing block having horizontal bars respectively interposed between the secondary batteries and a single vertical bar integrating the horizontal bars, the single vertical bar extending in a stacking direction of the plurality of pouch-type secondary batteries and the horizontal bars extending perpendicular to the single vertical bar.

9. The battery module according to claim 8, wherein the terrace portions of two secondary batteries are respectively adhered to an upper surface and a lower surface of the horizontal bar.

10. The battery module according to claim 8, wherein the horizontal bar is shaped to have a size identical to the height of a space between the terrace portions of two secondary batteries.

11. The battery module according to claim 8, wherein the secondary battery is configured with a rectangular shape whose outer circumference has two long sides and two short sides, so that the terrace portion is formed at the two short sides, and the spacing block is provided in a pair.

12. The battery module according to claim 1, wherein the fixing member at least partially includes a thermally-conductive polymer, or includes a thermally-conductive material containing a thermally-conductive filler and a polymer.

13. A battery pack, comprising the battery module according to claim 1.

* * * * *